(12) United States Patent
Girondi

(10) Patent No.: US 10,533,468 B2
(45) Date of Patent: Jan. 14, 2020

(54) VALVE GROUP WITH ELEMENTS IN SHAPE-MEMORY ALLOYS

(71) Applicant: UFI FILTERS S.p.A., Porto Mantovano, Mantova (IT)

(72) Inventor: Giorgio Girondi, Mantova (IT)

(73) Assignee: UFI FILTERS S.p.A., Porto Mantovano, Mantova (IT)

( * ) Notice: Subject to any disclaimer, the term of this patent is extended or adjusted under 35 U.S.C. 154(b) by 0 days.

(21) Appl. No.: 16/091,801

(22) PCT Filed: Apr. 6, 2017

(86) PCT No.: PCT/IB2017/051986
§ 371 (c)(1),
(2) Date: Oct. 5, 2018

(87) PCT Pub. No.: WO2017/175172
PCT Pub. Date: Oct. 12, 2017

(65) Prior Publication Data
US 2019/0153915 A1    May 23, 2019

(30) Foreign Application Priority Data
Apr. 7, 2016  (IT) .................. 102016000035857

(51) Int. Cl.
*F01M 1/10* (2006.01)
*F16K 39/02* (2006.01)
(Continued)

(52) U.S. Cl.
CPC .............. *F01M 1/10* (2013.01); *F01M 5/001* (2013.01); *F01M 5/002* (2013.01); *F16K 11/04* (2013.01);
(Continued)

(58) Field of Classification Search
CPC .... F01M 1/00; F01M 2011/033; F16K 11/04; F16K 31/002
See application file for complete search history.

(56) References Cited

U.S. PATENT DOCUMENTS 5,366,352 A * 11/1994 Deblois ................. F04B 39/066
                                                          417/292
6,085,871 A *  7/2000 Karamata .................. F16N 7/36
                                                          137/807
(Continued)

FOREIGN PATENT DOCUMENTS

DE        102 17 061 A1    3/2003
DE   20 2008 014 212 U     4/2010
(Continued)

OTHER PUBLICATIONS

International Search Report and Written Opinion of the International Searching Authority for International Patent Application No. PCT/IB2017/051986 dated Jul. 20, 2017, 12 pages.

*Primary Examiner* — Long T Tran
(74) *Attorney, Agent, or Firm* — Merchant & Gould P.C.

(57) ABSTRACT

A valve group (10) is housed in a duct (40) of a pressurized oil circuit of a vehicle. The valve group (1) extends along an axis (X-X) including a valve body (11) axially fixed to the conduit (40) and an obturator (15) fitted axially movably, on the valve body (11). The obturator (15) has an exchanger aperture (153) through which oil flows to a heat exchanger (3) in the circuit and an auxiliary aperture (152) through which the oil flows to an auxiliary component of the circuit. The valve group (10) includes a pair of elastically yieldable elements (180) of a material selected from among the shape-memory alloys, operatively connected between the valve body (11) and obturator (15), and suitable, as a
(Continued)

function of the oil temperature and/or the oil pressure, to axially move and to maintain the obturator (15) in a pre-defined axial position.

14 Claims, 10 Drawing Sheets

(51) Int. Cl.
    *F01M 5/00*         (2006.01)
    *F16N 39/02*        (2006.01)
    *F16N 39/04*        (2006.01)
    *F16K 11/04*        (2006.01)
    *F16K 31/00*        (2006.01)
    *F01M 11/03*       (2006.01)

(52) U.S. Cl.
    CPC ............ *F16K 31/002* (2013.01); *F16N 39/02* (2013.01); *F16N 39/04* (2013.01); *F01M 2011/033* (2013.01)

(56) References Cited

U.S. PATENT DOCUMENTS

| | | | | |
|---|---|---|---|---|
| 6,916,159 | B2* | 7/2005 | Rush | A61M 5/14216 |
| | | | | 417/321 |
| 8,196,708 | B2* | 6/2012 | Kung | F04B 43/06 |
| | | | | 184/27.4 |
| 10,041,481 | B2* | 8/2018 | Albright | F42B 10/14 |

FOREIGN PATENT DOCUMENTS

| | | |
|---|---|---|
| EP | 0 959 282 A2 | 11/1999 |
| EP | 1 752 628 A1 | 2/2007 |
| EP | 2 816 240 A1 | 12/2014 |
| WO | 2008/022874 A1 | 2/2008 |
| WO | WO-2008087058 A1 * 7/2008 | ........... F16K 15/033 |
| WO | 2016/034961 A1 | 3/2016 |

\* cited by examiner

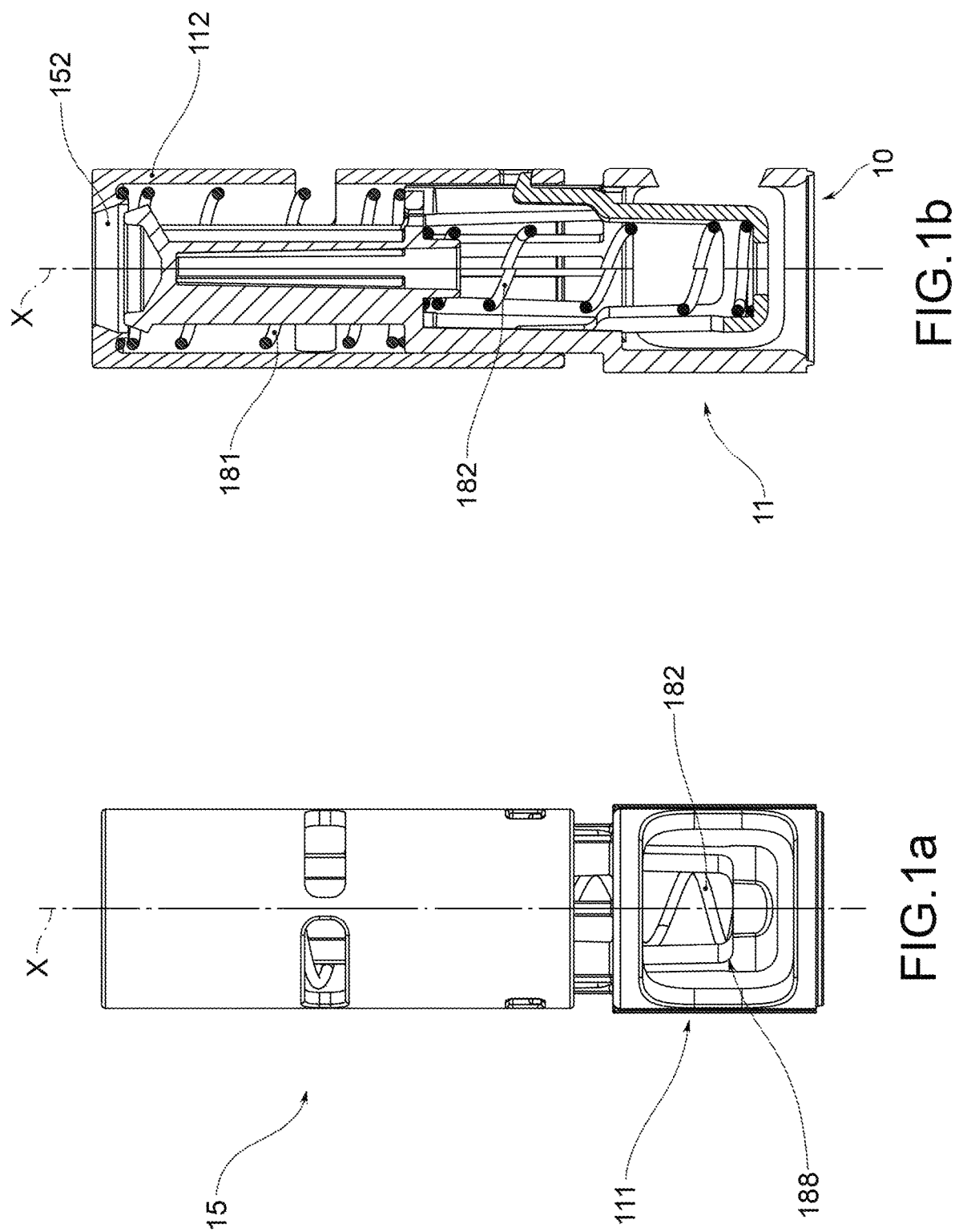

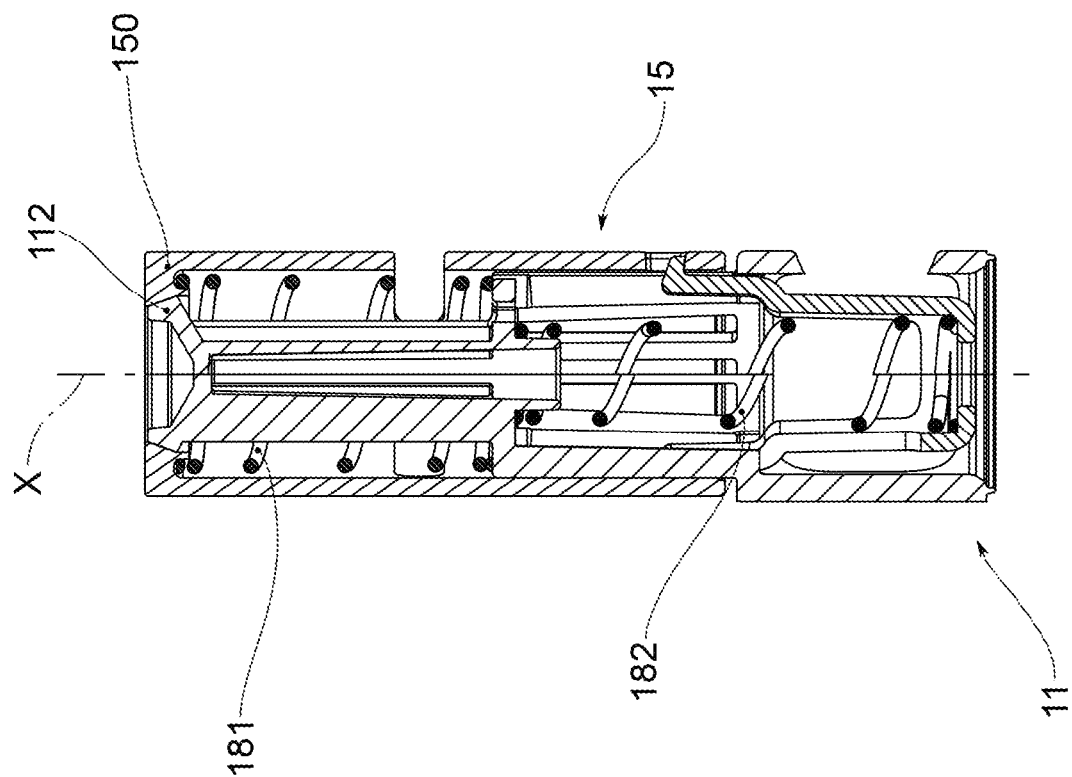
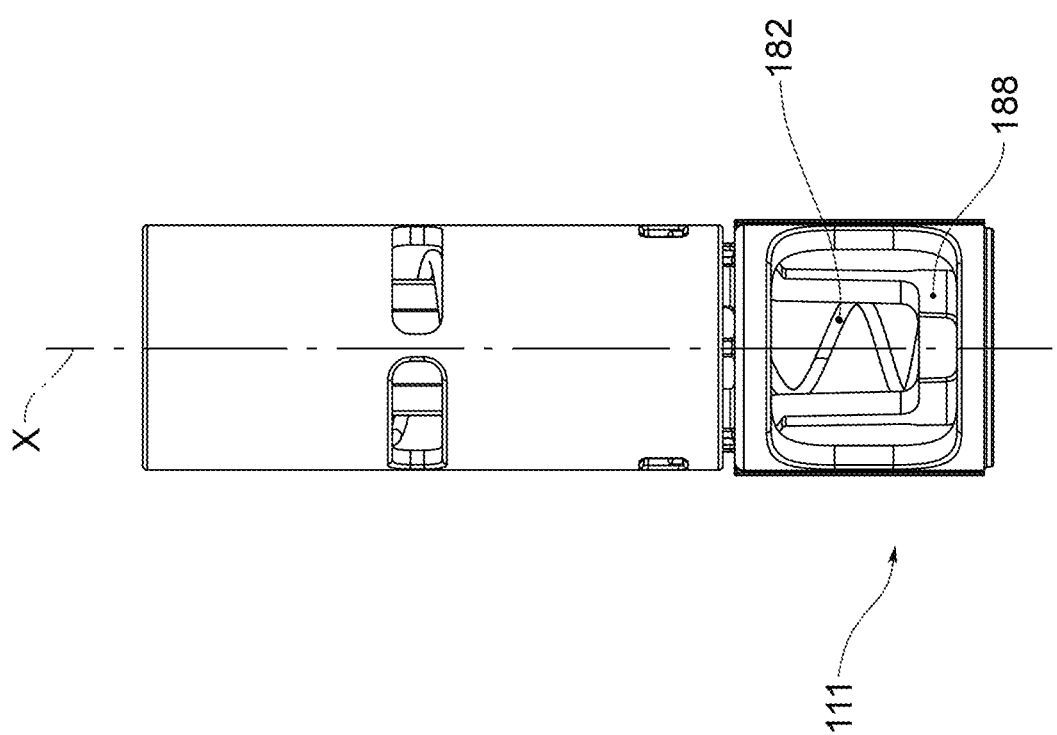

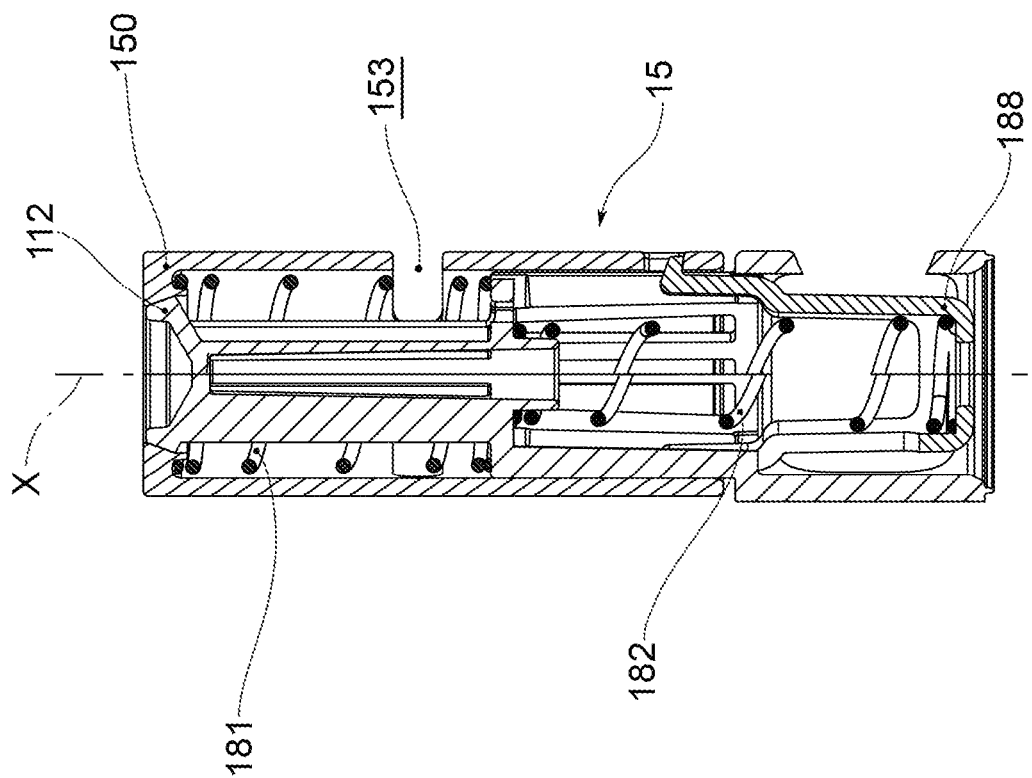
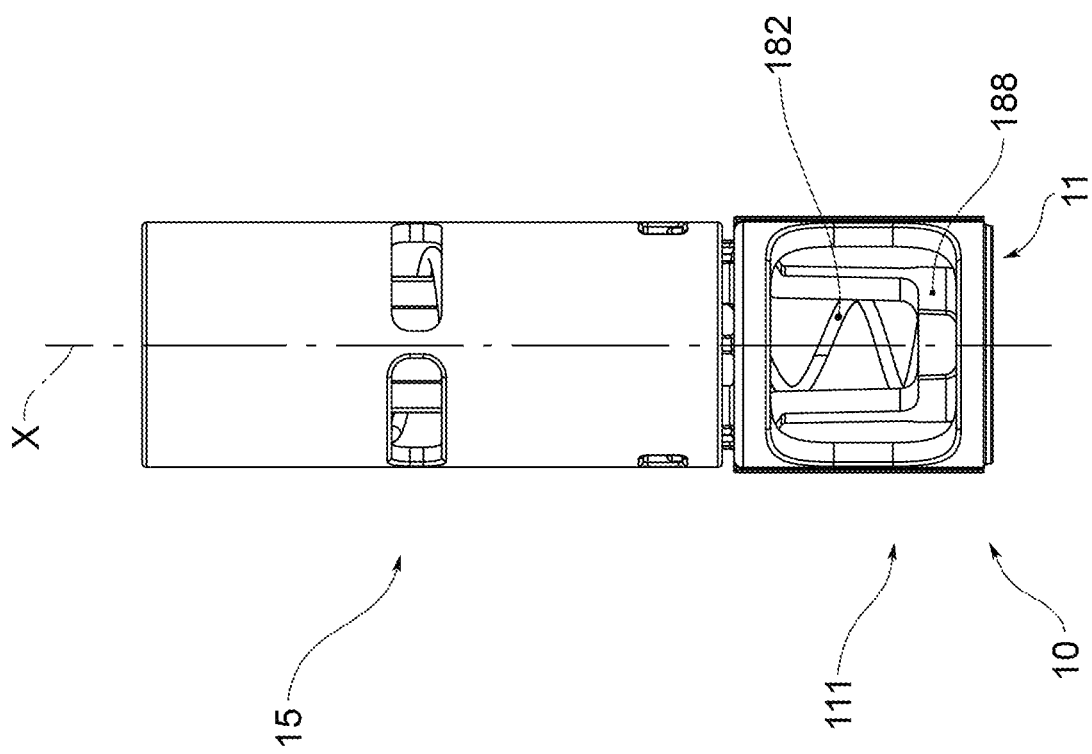

VALVE GROUP WITH ELEMENTS IN SHAPE-MEMORY ALLOYS

This application is a National Stage Application of PCT/IB2017/051986, filed 6 Apr. 2017, which claims the benefit of Serial No. 102016000035857, filed 7 Apr. 2016 in Italy, and which applications are incorporated herein by reference. To the extent appropriate, a claim of priority is made to each of the above-disclosed applications.

FIELD OF APPLICATION

The present invention relates to a valve group for a pressurized oil circuit of a vehicle, the pressurized oil circuit of a vehicle comprising said valve group, and an oil filtration assembly for the filtration of a predefined quantity of engine oil of a vehicle comprising said valve group.

A vehicle has a plurality of pressurized oil circuits which are suitable for putting a plurality of components in fluid communication.

In known circuits, the oil, in addition to undergoing the of pumping or suction actions that put it into circulation, is often subjected to other specific operations, e.g. variation of its temperature or filtration and cleaning through special filtration devices.

In particular, pressurized oil circuits are known which include a heat exchanger suitable to heat or cool the oil according to the requirements. Or again pressurized oil circuits are known that include a filtration device suitable to perform oil filtration and clean-up operations. Likewise, circuits are known that include both such components: for example, specific oil filtration assemblies are known suitable to be included in pressurized oil circuits which include at least one heat exchanger and at least one filtration device.

Preferably, such pressurized oil circuits are operatively connected to fundamental and specific components of the vehicle for which the characteristics of the oil are of substantial importance: e.g., to the engine group, the gearbox group (automatic type), or the transmission group.

In other words, in a vehicle there are provided pressurized oil circuits or filtration assemblies suitable for operating in different operating conditions depending on the operating modes of the component to which they are connected, e.g. depending on the operating modes of the engine.

Namely, the known pressurized oil circuits are suitable to bring about a variation in oil temperature according to the needs, for example, of the engine: in order to improve the heating phase of an engine connected to the circuit, the oil flowing therein is heated, preferably by means of a heat exchanger. In particular, the oil temperature is raised to a higher value when it is detected to be too low. Conversely, when the engine operates at high temperatures, and therefore the oil temperature is too high, the oil is cooled, preferably by means of the heat exchanger, and brought back to a lower value or maintained within a desired temperature range.

Similarly, for the engine requirements, the known pressurized oil circuits are suitable to bring about a variation in oil temperature according to that which is illustrated above, depending on the needs of the gearbox group or the transmission group.

To manage the flow control of the oil to the heat exchanger or to other auxiliary components, e.g. the filtration device, the circuits comprise a valve group suitable for controlling the passage of fluid to the heat exchanger or directly to the filtration device as a function of the temperature of the oil.

The known solutions of pressurized circuits and filtration assemblies are, therefore, particularly complex, specifically in the valve group solution and in its oil flow control management.

Moreover, the known solutions fail to handle any oil pressure spikes, for example coming from the engine. Such pressure spikes are particularly undesirable because they cause accelerated wear on the valve group or on the other components of the circuit through which oil flows, for example the heat exchanger or possibly the filtration device, thus impairing the useful life of the circuit in its entirety, and thereby the components subservient to the same.

An example of an embodiment of the valve group and of a pressurized oil circuit presenting such problems is shown in the document EP1752628.

Solution of the Invention

It is therefore strongly felt the need to provide a valve group that is suitable for ensuring the oil flows through the pressurized oil circuit is at an optimum temperature, e.g. by controlling its passage through a heat exchanger, and at the same time is suitable for resolving the aforementioned problem related to high pressure spikes in the oil.

The object of the present invention is to provide a valve group suitable for controlling the passage of oil through a heat exchanger according to its temperature, and that is also able to avoid accelerated wear due to pressure spikes.

DESCRIPTION OF THE FIGURES

Further characteristics and advantages of the invention will become apparent from the following description of its preferred embodiments, given by way of non-limiting example, with reference to the appended figures wherein:

FIG. 1 shows a sectional view of an oil filtration assembly according to a preferred embodiment, comprising the valve group which in FIG. 1' is placed in a vent configuration;

FIGS. 1a and 1b respectively illustrate a front view of the valve group shown in FIG. 1 in a front view and in a longitudinal sectional view;

FIGS. 2a and 2b respectively illustrate a front view of the valve group shown in FIG. 2 in a front view and in a longitudinal sectional view;

FIGS. 4a and 4b respectively illustrate a front view of the valve group shown in FIG. 4 in a front view and in a longitudinal sectional view;

DETAILED DESCRIPTION

Figure 1:
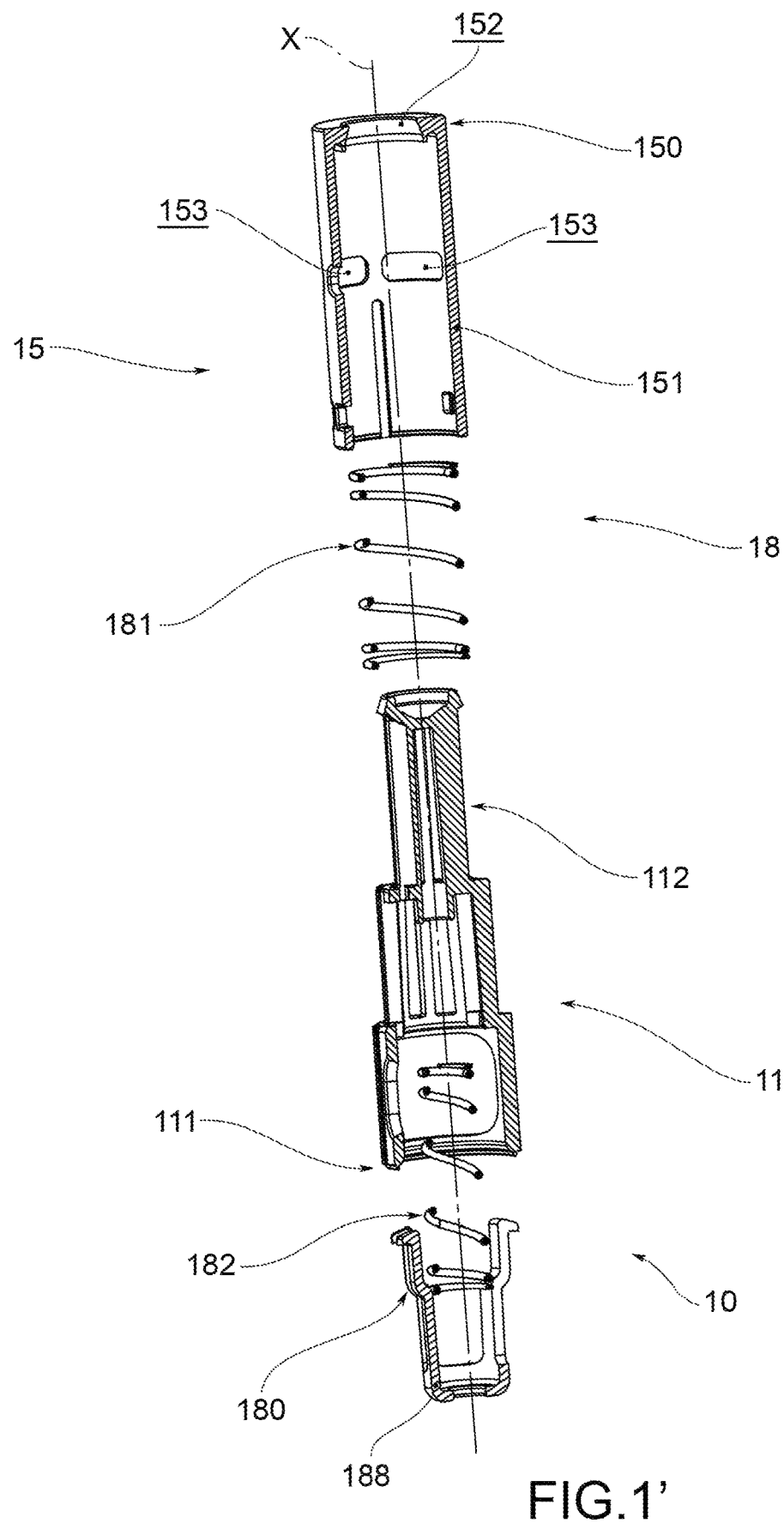
FIG. 1' is a perspective view in separate parts of the valve group object of the present invention in accordance with a preferred embodiment.
Figure 1:
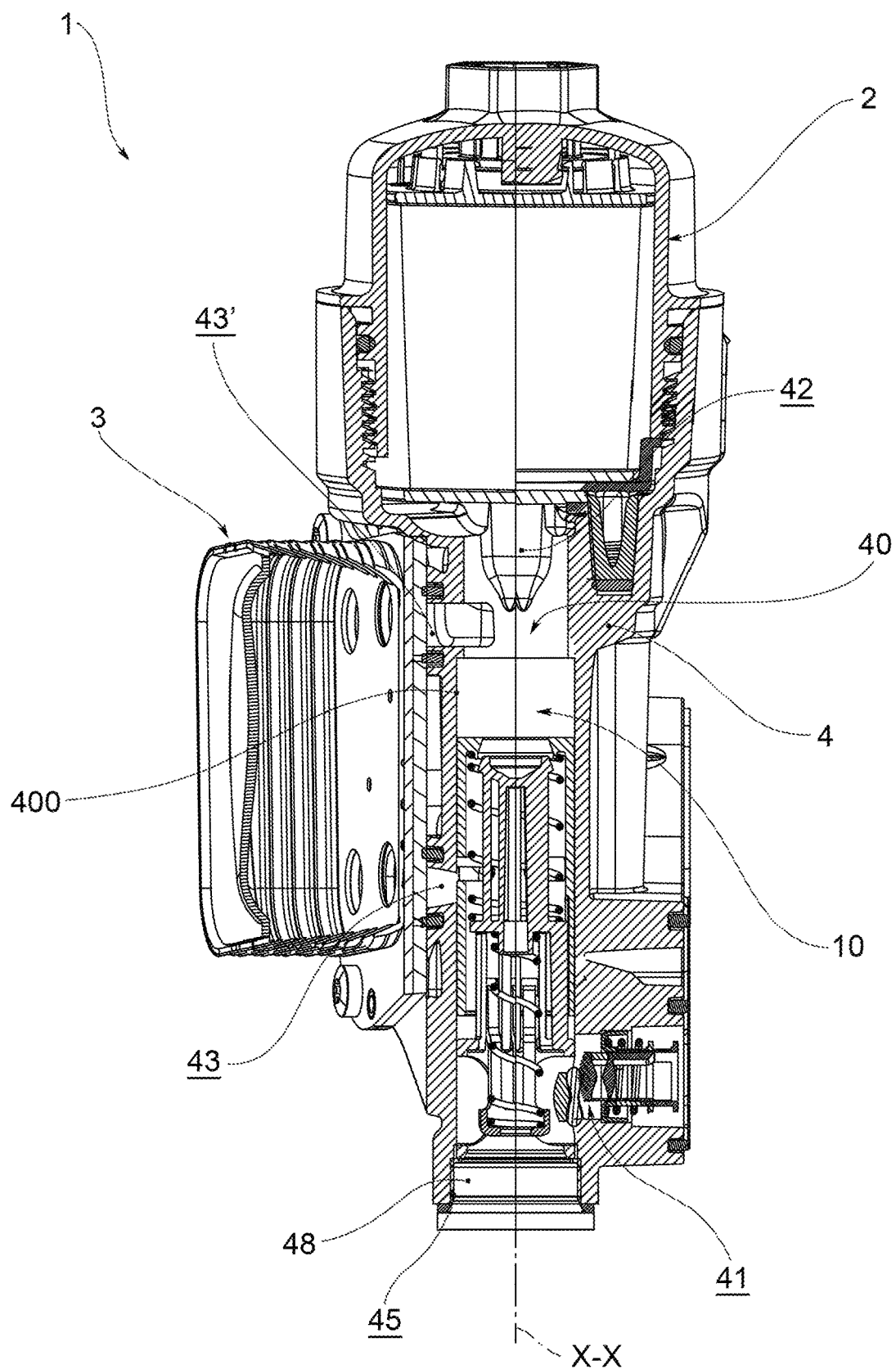

In the figures in the annex, the valve group object of the present invention is indicated at reference number 10.

The valve group 10 is housable in a duct 40 of a pressurized oil circuit of a vehicle.

Specifically, the valve group 10 is adapted to operate in any type of pressurized oil circuit, in accordance with the description provided hereinafter.

Hereinafter is described, in a non-limiting manner, the application of the valve group 10 in an oil filtration assembly 1 for the filtration of engine oil of a vehicle, in turn, object of the present invention. In fact, the operating modes of the valve assembly 10 described hereinafter with respect to the duct 40 comprised in the filtration assembly 1 are the same that apply to any duct of any pressurized oil circuit. In other words, the characteristics of the duct 40 comprised in the oil filtration assembly and the manner in which the valve group operates in its interior are the same both in the case wherein the duct is comprised in a filtration assembly such as the one described, and in the case wherein the duct is housed in a pressurized oil circuit and the duct is suitable to fluidically connect a heat exchanger.

Considering the merits of the embodiment of the filtering assembly 1, the same is mountable, for example by means of a specially shaped flange, on the engine of a motor vehicle, to be fluidically connected to the same.

The filtration assembly 1 comprises an oil filtration device 2. In a preferred embodiment, the oil filtration device 2 comprises a tubular-shaped filter septum and two support plates, upper and lower, which are fixed to opposite ends of the filter septum.

The filtration assembly 1 comprises a heat exchanger 3. In a preferred embodiment, the heat exchanger 3 is of the plate type adapted to delimit an alternating succession of flow channels for the coolant (e.g. water) and for the oil, so that the oil in contact with the plates performs a heat exchange to or from the same, increasing or decreasing its own temperature.

Furthermore, the filtration assembly 1 comprises a support body 4 for the filtration device 2 and the heat exchanger 3. The support body 4 is fixable to the engine, for example by means of a specially shaped flange.

In addition, the support body 4 comprises at least one duct 40 having at least one inlet mouth 41, through which oil flows from the engine, and at least one outlet mouth 42, through which the oil flows to the filtration device 2. In other words, the duct 40 is suitable to receive a predetermined quantity of incoming oil from the engine to transport it to the oil filtration device 2.

Not object of the present invention and therefore not described herein is the at least one return duct in turn comprised in the support body 4, which allows the filtered oil to follow the reverse path from the filtration device to the engine.

The duct 40 has on the side wall 400 that delimits it at least one exchanger mouth 43 through which the oil flows into the heat exchanger 3.

Preferably, moreover, on the side wall 400, the duct 40 also has at least one outlet exchanger mouth 43' through which the outgoing oil flows from the exchanger 3.

In the present description, "proximal" identifies the portions of the duct or components, e.g. comprised in the valve group described hereinafter, that are housed in it near the inlet mouth 41, whereas "distal" identifies portions of the duct or components described hereinafter which are instead nearer to the outlet mouth 42.

Preferably, the exchanger mouth 43 is proximal with respect to the outlet exchanger mouth 43'. That is to say, the exchanger mouth 43 is upstream of the outlet exchanger mouth 43'.

As already described, also the duct of a pressurized oil circuit, not comprised in the filtration assembly, has an inlet mouth, an outlet mouth, an exchanger mouth and an outlet exchanger mouth.

According to a preferred embodiment, the valve group 10, object of the present invention, is housable in the duct 40 and extends lengthwise along an axis X-X. Preferably, the duct 40 extends at least in its proximal portion along said axis X-X so that the side wall 400 has radial extension relative to the axis X-X.

The valve group 10 comprises a valve body 11 that extends axially along the axis X-X fixed to the duct 40, e.g. on the support body 4. Preferably, the valve body 11 is, in fact, adapted to engage the side wall 400 of the duct 40, in a manner such as to be axially fixed thereto. Preferably, the valve body 11 comprises a block portion 111 in a proximal position adapted to engage the side wall 400 of the duct 40, e.g. with forced coupling.

The valve group 10, furthermore, comprises an obturator 15, which extends along the axis X-X, fitted, axially movable, on the valve body 11. Preferably, depending on the position of the obturator 15, the oil is directed toward the oil filtration device 2 or toward the heat exchanger 3.

The obturator 15, in a preferred embodiment, has an exchanger aperture 153 through which the oil flows to the exchanger 3 when positioned facing the exchanger mouth 43 in a first operating configuration and a third operating configuration.

Moreover, the obturator 15 comprises an auxiliary aperture 152 through which the oil flows in the circuit toward an auxiliary component comprised in the circuit, for example, toward the filtration device 2, with the obturator 15 placed in a second operating configuration and/or a vent configuration. In other words, the quantity of oil flowing through the auxiliary aperture 152 does not flow toward the exchanger 3.

According to a preferred embodiment, the auxiliary aperture 152 is placed in a distal position, preferably at one end of the obturator 15, preferably downstream of the exchanger aperture 153 with respect to the direction of flow.

Preferably, the obturator 15 has a hollow, axisymmetric shape having an obturator head 150 at its end and obturator walls 151 along the axis X-X. The auxiliary aperture 152 is therefore formed on said obturator head 150, preferably centrally thereto, for example on the axis X-X. That is to say the obturator 15 is cylindrical in shape, hollow, extending with the obturator walls 151 from the obturator head 150 on which is formed the auxiliary aperture 152.

In other words, the valve body 11 comprises a head portion 112 on which the obturator 15 is suitable to be fitted. Preferably, the head portion 112 is also suitable to act as a support and guide to the obturator 15 in its axial movement, i.e., the obturator 15 slides axially on said head portion 112, in a manner such that the block portion 111 also performs the function of the end stop, preferably lower, of the obturator 15. Preferably, the head portion 112 is adapted to control the flow section of the auxiliary aperture 152 of the obturator 15 to allow and/or prevent the flow of oil through the auxiliary opening 152 during the various operating conditions of the valve.

In accordance with a preferred embodiment, the valve body 11 is provided internally with a plurality of passages for the oil, in a manner such that the oil flows internally to the valve body 11, filling the inside of the obturator 15 and flowing out through the above-described apertures.

According to a preferred embodiment, the valve group comprises obturator positioning and movement means 18 suitable for controlling the movement of the obturator 15 when specific oil conditions arise. Moreover, the obturator positioning and movement means 18 are suitable to keep the obturator 15 in a preferred axial position. In addition, the obturator positioning and movement means 18 are adapted to operate on the obturator to return it, as illustrated below, to a first operating configuration or basic configuration, depending on the state of the oil.

In particular, the positioning and movement means 18 comprise a pair of elastically yieldable elements 180 comprising a first element 181 and a second element 182. In particular, said pair of elastically yieldable elements 180 are sensitive to the temperature of the oil and sensitive to the pressure of the oil.

In fact, the first element 181 and the second element 182 are both made of a material selected from among the shape-memory alloys, and therefore, as a function of oil temperature Toil, are such as to modify their crystalline structure, and therefore vary their elastic yieldability.

Furthermore, the first element 181 and second element 182 are both elastically yieldable, and therefore the oil pressure above a determined pressure value surpasses the combined action of the two elements on the obturator 15.

According to a preferred embodiment, the first element 181 and second element 182 are arranged along the axis X-X and are suitable to operate along this direction in the opposite direction.

In accordance with a preferred embodiment described hereinafter, the obturator 15 is engaged by said pair of elastically yieldable elements 180 in a manner such that, as a function of the oil temperature Toil, the summation of the respective axial actions of the first element 181 and the second element 182 is such as to control the obturator's positioning 15 in a predefined axial position wherein the oil flows through the auxiliary aperture 152 or through the exchange aperture 153.

In addition, the pair of elements 180 being elastically yieldable, the summation of the two actions is such as to keep the obturator 15 in a predefined axial position, e.g. in the first operating configuration, or in the third operating configuration, but at the same time is such as to allow, if exceeded, the movement of the obturator 15 as a function of the oil pressure to the vent configuration.

Figure 2:
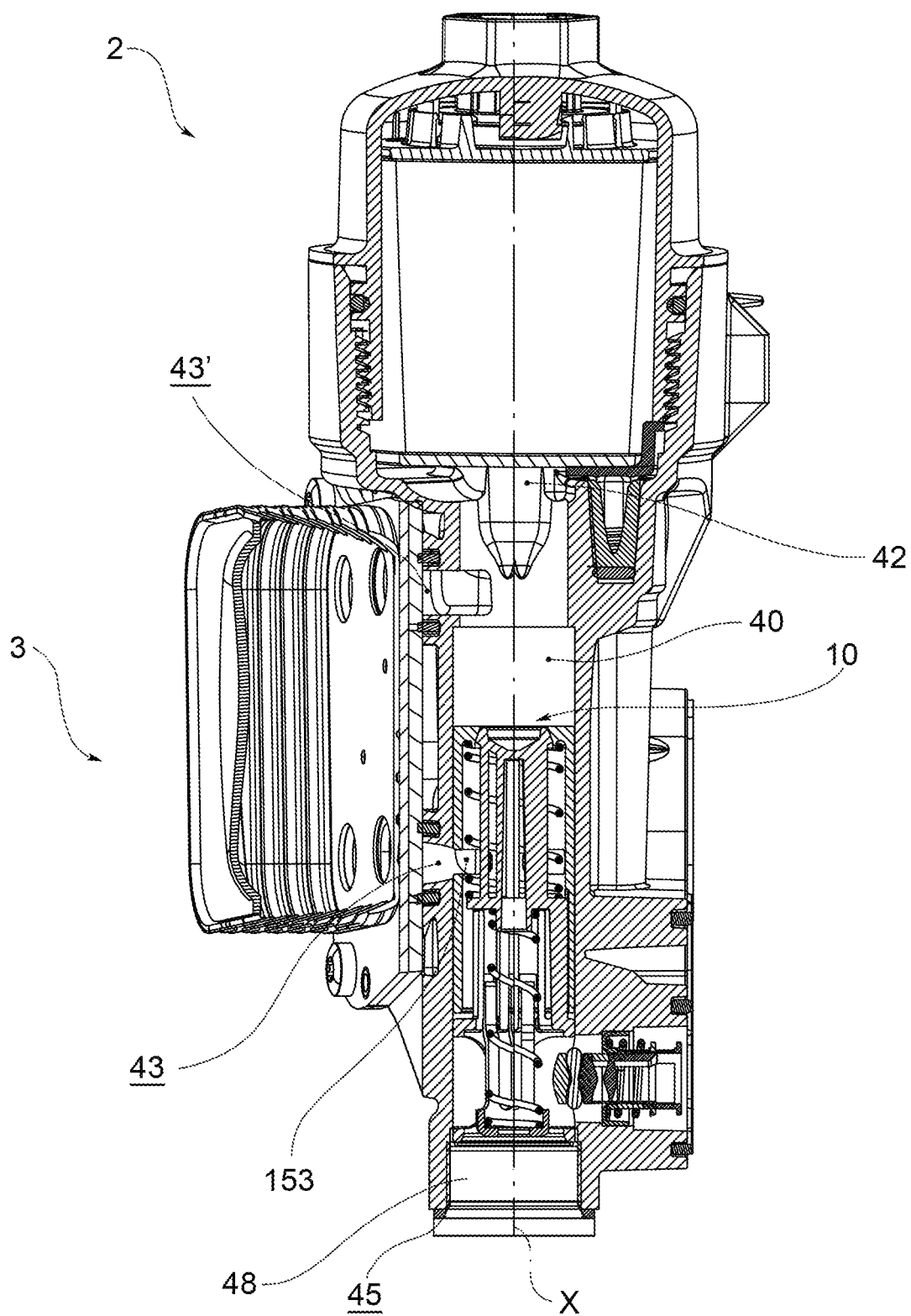
FIG. 2 shows a sectional view of the oil filtration assembly of FIG. 1, wherein the valve group comprised in it is placed in a first operating configuration.
Figure 3:
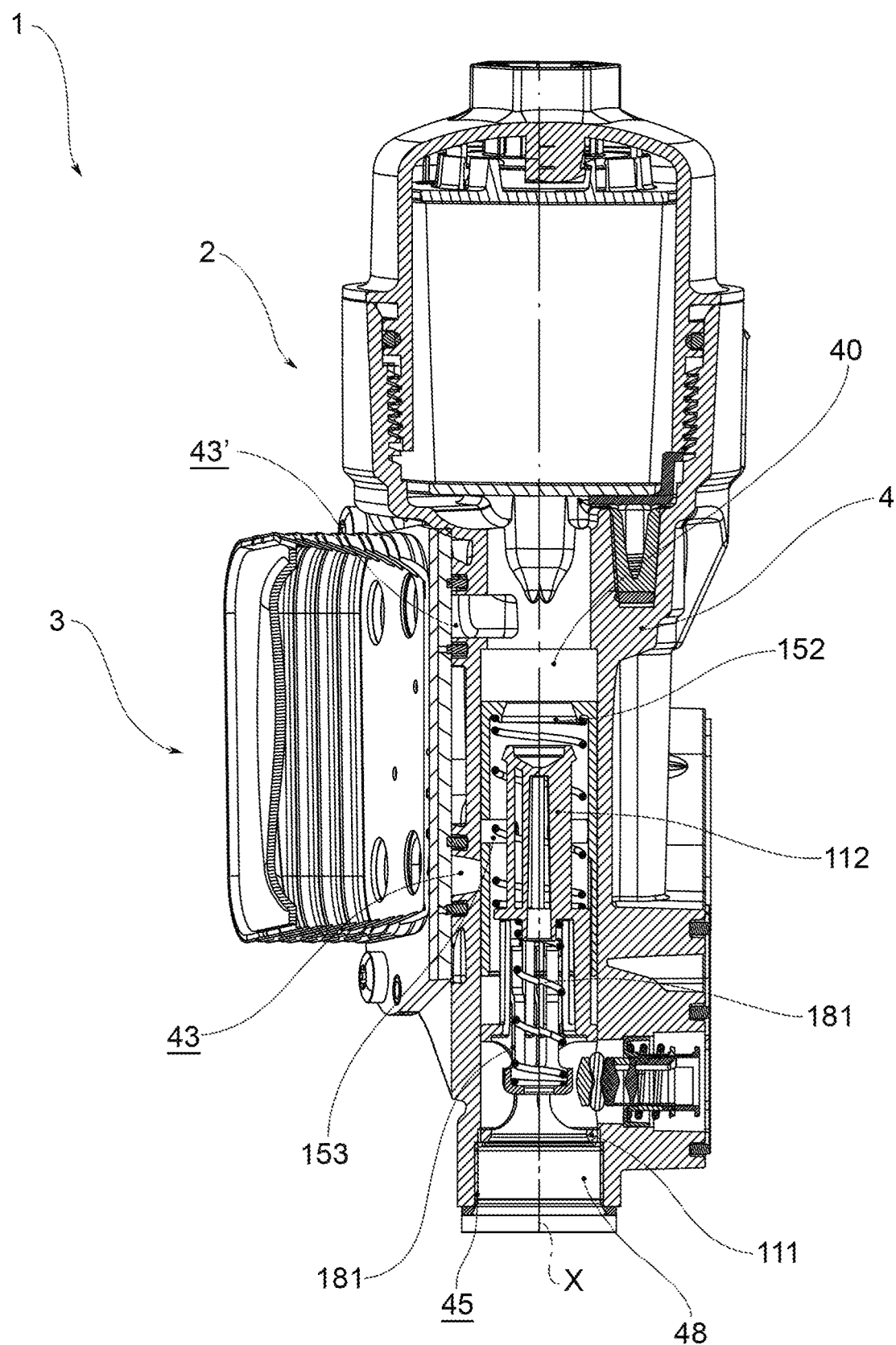
FIG. 3 shows a sectional view of the oil filtration assembly of FIG. 1, wherein the valve group comprised in it is placed in a second operating configuration.
Figure 3B:
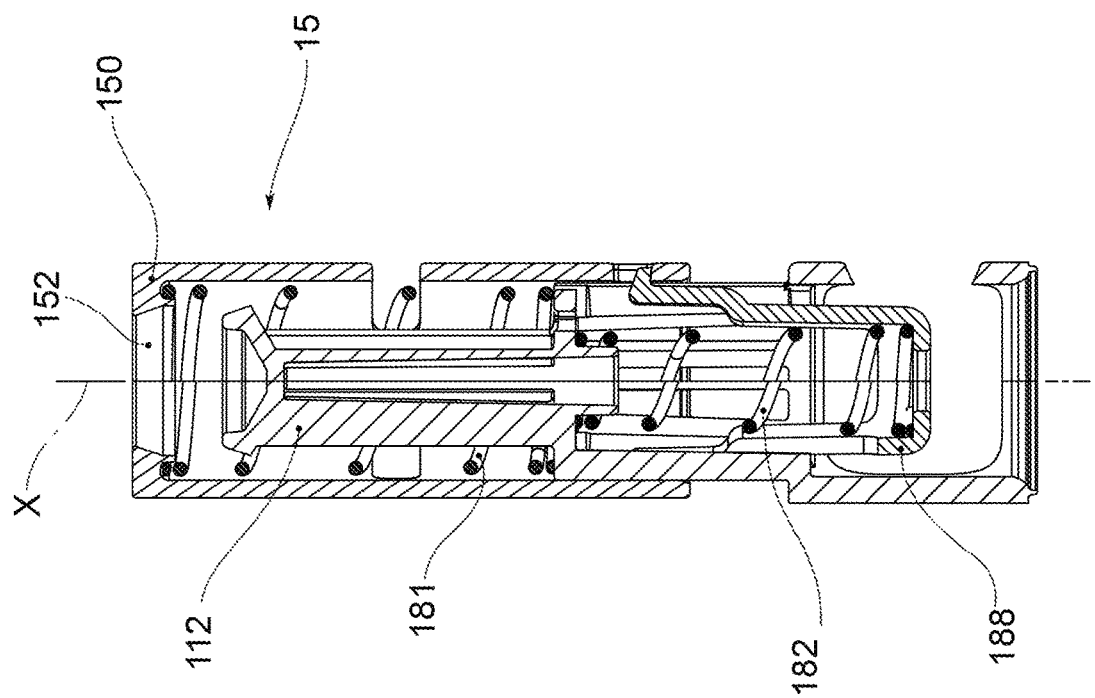
FIGS. 3a and 3b respectively illustrate a front view of the valve group shown in FIG. 3 in a front view and in a longitudinal sectional view.
Figure 3A:
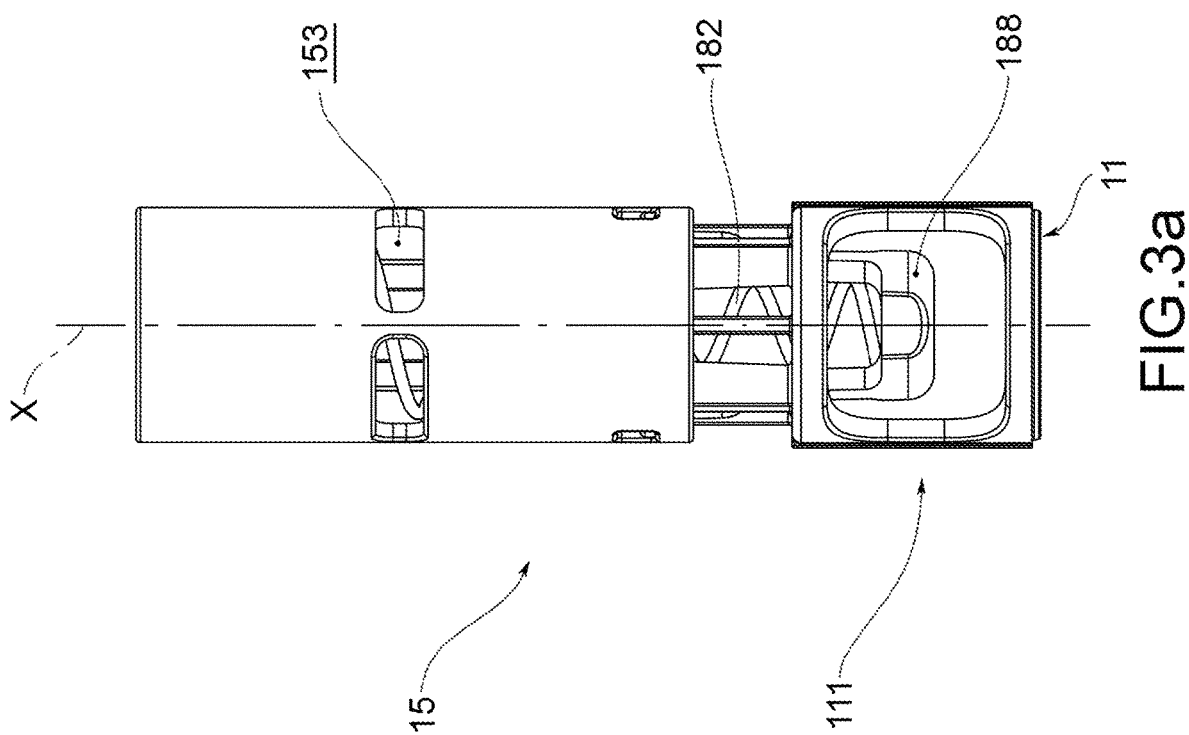
Figure 4:
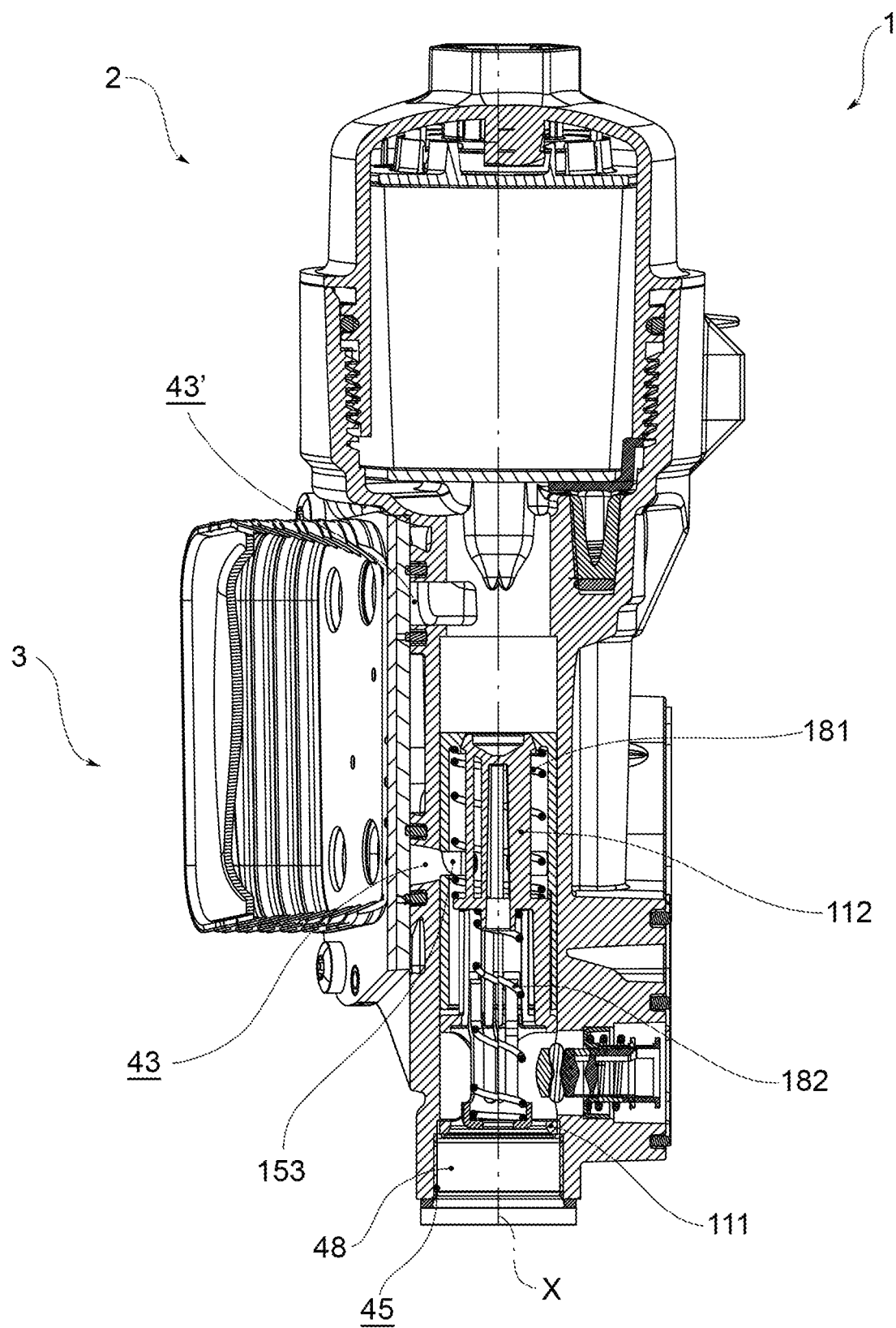
FIG. 4 shows a sectional view of the oil filtration assembly of FIG. 1, wherein the valve group comprised in it is placed in a third operating configuration (which in this preferred embodiment of the assembly coincides with the first operating configuration)

In other words, due to, and by means of, the obturator positioning and movement means 18, the obturator 15 is positioned in a plurality of positions corresponding to respective operating configurations of the valve group 10; said configurations comprise:

a first operating configuration, or basic configuration, or oil heating configuration, wherein the obturator 15 is in an axial position wherein the exchanger aperture 153 is positioned facing the exchanger mouth 43 and the head portion 112 of the valve body 11 engages the obturator 15 to prevent oil from flowing through the auxiliary aperture 152; preferably, in this configuration, the obturator 15 is in a proximal position in abutment on the block portion 111; preferably, the obturator positioning and movement means 18 are suitable to maintain or return the obturator 15 to such position when it is not moved to the other positions, as described hereinafter (such configuration is shown in a non-limiting example in FIG. 2);

a second operating configuration, or configuration with hot oil, in which the obturator 15 is in an axial position wherein the exchanger aperture 153 does not face the exchanger mouth 43 (in fact the obturator wall 151 is positioned in front of it) wherein the obturator head 150 is displaced from the head portion 112, leaving free the auxiliary aperture 152 through which the oil flows; preferably, in this configuration the obturator 15 is in an offset position with respect to its axial position in the first operating configuration (such configuration is shown in a non-limiting example in FIG. 3);

a third operating configuration, or cooling configuration, in which the obturator 15 is in an axial position wherein the exchanger aperture 153 is positioned facing the exchanger mouth 43; wherein the block portion 111 engages the obturator head 150 in a manner such that the transit of oil through the auxiliary aperture 152 is impeded; preferably, in a preferred embodiment, the third operating configuration is similar to the first operating configuration (such configuration is shown in a non-limiting example in FIG. 4);

a vent configuration in which the obturator 15 subjected to the action of the pressurized oil surpassing the action of the obturator positioning and movement means 18 is pushed and arranged in a distal position wherein the obturator head 15 is displaced from the block portion 111 in a manner such that the oil flows through the auxiliary aperture 152; preferably, in this configuration the obturator 15 is in an offset position with respect to the axial position wherein it is located, e.g. corresponding to the first operating configuration (such configuration is shown in a non-limiting example in FIG. 1) or corresponding to the third operating configuration.

Preferably, a range of oil operating temperatures is identified, delimited by a lower threshold temperature value Tinf and an upper threshold temperature value Tsup. In other words, the value of the detected temperature of the oil is lower than the lower threshold temperature value Tinf, comprised in the operating temperature range, or higher than the upper threshold temperature value Tsup. Preferably, such operating temperature range is identified as between 80° C. and 105° C. and preferably between 85° C. and 100° C.

In addition, an optimal temperature range is also identified wherein the oil is at an optimal temperature for the operation of the engine. Preferably, the optimal temperature range is adjacently higher (greater than the upper threshold temperature value Tsup) than the operating temperature range. For example, preferably, the optimal temperature has a value in the range between 105° C. and 150° C.

In accordance with the foregoing, the first operating configuration corresponds to a situation wherein the oil is at a temperature lower than the operating temperature range, i.e. lower than the threshold temperature value Tinf. In this situation, the oil is forced to flow through the heat exchanger 3 and is heated up to a higher temperature.

If, however, the oil in the duct 40, coming from the engine, is at a temperature within said operating temperature range, the valve group 10 is put into the second operating condition, allowing the oil to flow directly towards the auxiliary aperture 152, e.g. toward the filtration device 2, and then to the engine. Preferably, this configuration keeps the oil from passing into the heat exchanger 3, accelerating the attainment by the oil of a temperature having a value within the optimal temperature range.

The third operating configuration corresponds to the situation wherein the oil is at a higher temperature than the operating temperature range, i.e. above the upper threshold temperature value Tsup, i.e. at a temperature within the optimal temperature range. In contrast to the situation wherein the oil is at a lower temperature than the one delimited by the operating temperature range, the oil, passing through the heat exchanger 3, is cooled in order to keep it within such optimal temperature range, preventing it from constantly rising in temperature and thus allowing the engine to continue to operate in an optimal condition.

Preferably, also the of transitional operating temperature range is identified, to which correspond mixed configurations, wherein a quantity of oil passes through the exchanger aperture 153 toward the heat exchanger 3, while the remaining quantity of oil passes through the auxiliary aperture 152 toward the filtration device 2. For example, a transitional configuration occurs, wherein the obturator 15 is axially arranged in a manner such that the oil passes through both the exchanger aperture 153 and the auxiliary aperture 152, at an oil temperature between 80° C. and 85° C. Or again by way of example, a further transitional configuration occurs at an oil temperature between 100° C. and 105° C.

Figure 5:
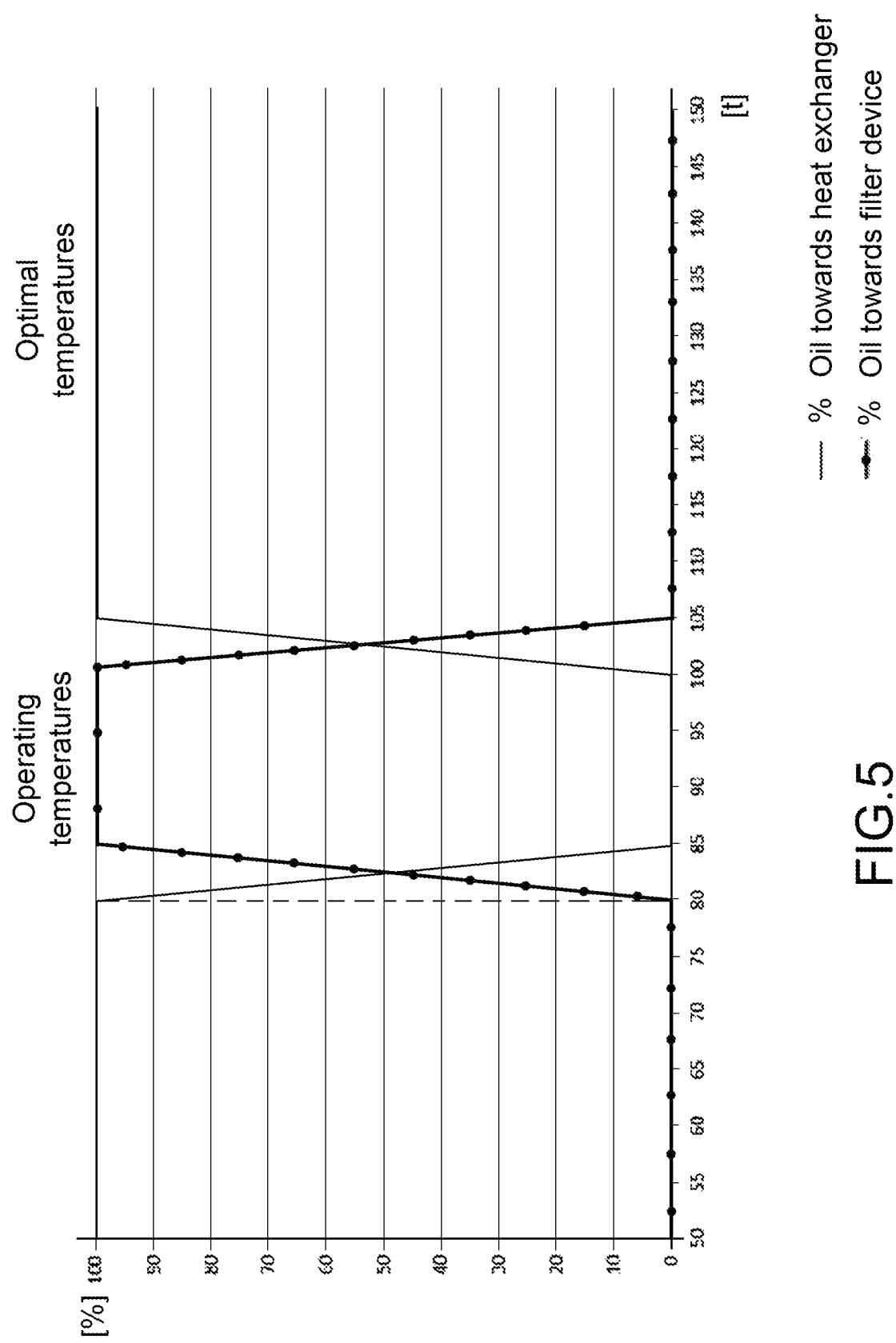
FIG. 5 shows a graph in which is shown the quantitative amount, in percentage, of oil flowing towards the heat exchanger or towards the filtration device as a function of the temperature of the oil in an oil filtration assembly, employed, for example, in small-sized vehicles.

The figure shows a graph of the quantity (in percentage) of oil that flows toward the heat exchanger 3 or towards the filtration device 2 as a function of its temperature. The aforementioned temperatures and the aforementioned temperature range, as well as FIG. 5, are related to specific automotive applications for motor vehicles, typically of medium size. In fact, for industrial vehicles the said temperature values may be different, e.g., lower those mentioned above.

As mentioned, the temperatures referred to above make reference to an application of the filtration assembly which operates with the engine of a vehicle. In applications wherein the valve group is comprised in different pressurized oil circuits from the one wherein the filter assembly is employed, such temperatures will be different than those listed above, for example the optimal oil temperatures are different in the embodiment wherein the pressurized oil circuit is connected to a gearbox group or a transmission group rather than to an engine.

According to a preferred embodiment, excessive oil pressure spikes, typically present at one of the oil's cold temperatures, i.e. lower than the lower threshold temperature value, but also possibly present at one of its high temperatures, i.e. higher than the upper threshold temperature value, correspond to potential damage to the valve group 10 and/or to the heat exchanger 3 if the oil flows toward the same.

Due to the pair of elastically yieldable elements 180, however, the obturator 15, by the action of a pressure spike, is permitted to move axially in the vent configuration in a manner such that the oil flows toward the auxiliary aperture 152 and the pressure is not discharged into the valve group 10 and/or into the heat exchanger 3. Preferably, therefore, a pressure threshold value is defined above which the obturator 15 is induced to move; e.g., such threshold pressure value is 2 bar.

In accordance with that which is described above, the first element 181 and the second element 182 operate with the valve body 11 and the obturator 15 along the axis X-X in two directions opposite of each other by performing a combined action on the obturator.

In a preferred embodiment, the first element 181 reacts (and changes its crystalline composition) at a first transition temperature T1, while the second element 182 reacts (and changes its crystalline composition) at a second temperature T2 higher than the first transition temperature T1.

In other words, the first element 181 has a first elastic modulus M1 and the second element 182 has a second elastic modulus M2, wherein the first elastic modulus M1 and the second elastic modulus M2 are variable according to the characteristics of the oil and in particular the temperature. Preferably, in the first operating configuration, or in the third operating configuration, the first elastic modulus M1 is lower than the second elastic modulus M2. Conversely, in the second operating configuration, the first elastic modulus M1 is greater than the second elastic modulus M2.

In accordance with a preferred embodiment, substantially, the first transition temperature T1 corresponds to said lower threshold temperature Tinf, while the second transition temperature T2 corresponds to said upper threshold temperature Tsup.

In other words, the obturator 15 is moved axially by the first element 181 and/or by the second element 182 as a function of the oil temperature Toil, in a manner such that the obturator 15 is:

in the first operating configuration if the oil temperature Toil is lower than the first transition temperature T1;

in the second operating configuration if the oil temperature Toil is higher than the first transition temperature T1, but lower than the second transition temperature T2;

in the third operating configuration if the oil temperature Toil is higher than the second transition temperature T2.

According to a preferred embodiment, the obturator positioning and movement means 18 comprise a retaining portion 188 engaged with the obturator 15, and movable axially with the latter.

Preferably, the retaining portion 188 is snapped to the obturator 15, e.g. to the obturator wall 151 at its proximal end opposite to the obturator head 150.

Preferably, the retaining portion 188 is operatively connected to the valve body 11 through the second element 182, in a manner such that the second element 182 performs an action on the retaining portion 188 to keep the obturator 15 in the first operating configuration and allows the movement of the obturator 15 into the vent configuration when stressed by the action of oil under pressure. That is to say that, if the oil pressure has a value greater than a predefined threshold pressure value, i.e., has an overpressure value, the obturator 15 is subjected to the pressure, which, exceeding the retaining action of the combination of the two actions of the pair of elastically yieldable elements 180, pushes the obturator 15 into the vent configuration.

Preferably, the retaining portion 188 extends along the axis X-X, in a manner such as to be housed in the base portion 111 of the valve body 11, in the first operating configuration.

Preferably, the retaining portion 188 is substantially hollow-shaped or U-shaped or C-shaped, in a manner such that, by means of its arms, it engages the obturator 15 and houses internally the second element 182.

According to a preferred embodiment, the second element 182 is a helical spring operating between the valve body 11 and the retaining portion 188.

Furthermore, in a preferred embodiment, also the first element 181 is a helical spring operating between the obturator 15 and the valve body 11, preferably fitted on the head portion 112.

According to a preferred embodiment, the valve group 10, object of the present invention, has a substantially axisymmetric structure in its components. For example, the exchanger aperture 153 extends for a section of radial circumference, or, for example, the valve body 11 has an axisymmetric development. Preferably, at the same axial height, in a preferred embodiment, one may identify a plurality of radial apertures, e.g. four in number.

According to a preferred embodiment, the valve group 10 is insertable and removable as a cartridge inside the duct 40. For example, the support body 4 has an access mouth 45, preferably located along the axis X-X, through which the valve group 10 is insertable or removable. Preferably, the support body 4 comprises a cap 48 suitable for closing the access mouth 45 and at the same time suitable for acting as an axial stop for the valve group, together with the block portion 111.

Preferably, the same oil pressure circuit has a special access mouth and a related cap adapted to allow the valve group 10 to be inserted and extracted as a cartridge within a respective duct 40.

Innovatively, the valve group, the pressurized oil circuit that comprises it, and, in turn, the oil filtration assembly that comprises it widely fulfil the purpose of the present invention by overcoming the typical problems of the prior art.

Advantageously, in fact, the valve group is adapted to manage and direct in the best way the oil to the components that constitute the pressurized oil circuit according to the physical characteristics of the oil so as to allow the engine and/or the gearbox group and/or the transmission group to always work under optimum conditions.

In particular, by managing the flow of oil through the oil heat exchanger, the oil is heated or cooled in a manner such that it is returned to the engine, the gearbox group, or the transmission group at a desired temperature, preferably optimal.

In fact, advantageously, in an operative condition corresponding to the cold engine (or the gearbox, or the transmission) in which the oil temperature is too low, the valve group, in the shortest time possible, directs the oil towards the heat exchanger to heat it. In other words, advantageously, the valve group is suitable for controlling the oil according to its temperature in a manner such as to accelerate reheating and thus accelerate the heating phase of the engine itself.

Advantageously, the oil is furthermore maintained in the optimal temperature range by virtue of the third operating configuration; in fact, in the third operating configuration a further rise in temperature is avoided in a manner such that, once reached, it is maintained in the optimal temperature range.

Advantageously, the valve group, the heat exchanger and other components fluidically connected by means of the pressurized oil circuit are protected from damage due to pressure spikes. The oil pressure spikes are effectively managed by the valve group, which allows the venting of any overpressure, safeguarding both the valve group and the heat exchanger, which is in fact bypassed by the oil. Preferably, such circumstance is effectively handled in the operating situation presented by cold oil, e.g. due to a cold engine and typically characterized by frequent pressure spikes, but it is also effectively managed in other operating conditions, for example in the case of elevated oil temperatures.

A still further advantageous aspect lies in the fact that the valve group is simple and inexpensive to manufacture.

Furthermore, advantageously, the valve group is extremely versatile in its application. In fact, the valve group is easily adjustable by specifically selecting the type of elastically yieldable elements, in particular by carefully selecting the shape-memory material and the shape of the elastically yieldable element. Advantageously, the action of the two elements on the obturator is effectively measurable and the axial travel of the latter is adjustable.

Advantageously, according to its application, e.g. according to the type of pressurized oil circuit for which it is intended, e.g., in the engine or gearbox or transmission oil circuit, or in small or medium-sized vehicles or industrial vehicles, the valve group has the same aforementioned components, varying from one application to another only in their elastic components.

Advantageously, the two elastically yieldable elements are totally bathed in the oil and thus they are ready to react abruptly to an oil temperature variation.

Advantageously, the crystalline transition of the first element and/or the second element occurs in a precise, predefined temperature range, limiting fully transitional configurations. Advantageously, the obturator's transition into different configurations is accurate, immediate and easy to manage.

Moreover, advantageously, a specially designed duct is not required since the valve group operates on the oil autonomously, i.e. advantageously, it is not necessary to provide the duct with specific shoulders at the different obturator positions, since the valve group autonomously performs the described positions by operating directly with the obturator, pushing and holding it according to the different operating conditions.

It is clear that a person skilled in the art, in order to satisfy contingent requirements, may make changes to the valve group or to the oil circuit or to the filtration assembly which are fully contained within the scope of protection as defined by the following claims.

LIST OF REFERENCE NUMBERS 1 oil filtration assembly
2 oil filtration device
3 heat exchanger
4 support body
40 duct
41 inlet mouth
42 outlet mouth
43 exchanger mouth
43 outlet exchanger mouth
45 access mouth
48 cap
400 side wall
10 valve group
11 valve body
111 block portion
112 head portion
15 obturator
150 obturator head
151 obturator walls
152 auxiliary aperture
153 exchanger aperture
18 obturator positioning and movement means
180 elastically yieldable elements
181 first element
182 second element
188 retaining portion
Toil oil temperature
T1 first transition temperature
T2 second transition temperature
M1 first elastic modulus
M2 second elastic modulus

The invention claimed is:

1. A valve group housable in a duct of a pressurized oil circuit of a vehicle, wherein the circuit comprises a heat exchanger and at least one auxiliary component, fluidically connected to the duct, wherein the valve group extends in length along an axis, comprising:
   a valve body that extends along the axis axially fixable to the duct;
   an obturator, which extends along the axis, fitted, axially movable, on the valve body, comprising:
      an exchanger aperture through which oil flows to the heat exchanger, in a first operating configuration and a third operating configuration;
      an auxiliary aperture through which the oil flows to the auxiliary component, rather than to the heat exchanger, in a second operating configuration and/or in a venting configuration;
      means for positioning and moving the obturator comprising a pair of elastically yieldable elements, comprising a first element and a second element, operatively connected between the valve body and obturator, wherein the first element and the second element are both made of a material selected from among shape-memory alloys, in which the pair of elastically yieldable elements is configured, as a function of the oil temperature and/or the oil pressure, to permit the axial movement of the obturator, to axially move the obturator, and to maintain the obturator in a predefined axial position.

2. Valve group according to claim 1, wherein the first element and the second element operate with the valve body and obturator along the axis in two directions opposite of each other.

3. Valve group according to claim 1, wherein the first element is made of a first material selected from among the shape-memory alloys, and the second element is made of a second material selected from the shape-memory alloys, wherein the first element reacts to a first transition temperature and the second element reacts to a second temperature higher than the first transition temperature.

4. Valve group according to claim 1, wherein the obturator is moved axially by the first element and/or the second element as a function of the oil temperature so that the obturator is:
   in the first operating configuration if the oil temperature is below the first transition temperature;
   in the second operating configuration if the oil temperature is above the first transition temperature, but below the second transition temperature;
   in the third operating configuration if the oil temperature is above the second transition temperature.

5. Valve group according to claim 1, wherein the first element and the second element are positioned along the axis, wherein the oil flowing into the valve group meets the second element and subsequently the first element.

6. Valve group according to claim 1, wherein the means for positioning and moving comprise a retaining portion engaged to the obturator (15), and movable axially with the obturator, wherein the retaining portion is operatively connected with the valve body through the second element so that the second element performs an action on the retaining portion to maintain the obturator in the first operating configuration, and allows movement of the obturator in the vent configuration when stimulated by action of oil under pressure.

7. Valve group according to claim 6, wherein the second element is a helical spring acting between the valve body and the retaining portion.

8. Valve group according to claim 1, wherein the valve body extends in length with a head portion configured to engage the obturator to block the auxiliary aperture and prevent the passage of oil through the head portion with the obturator placed in the first operating configuration and in the third operating configuration.

9. Valve group according to claim 1, wherein the obturator has an axially symmetrical development, presenting the auxiliary aperture in the head portion, concentrically to the axis, and the exchanger aperture side in a radial direction.

10. Valve group according to claim 1, wherein the first element is a helical spring acting between the valve body and the retaining portion fitted on the head portion.

11. Valve group according to claim 1, wherein the first element has a first elastic modulus and the second element has a second elastic modulus, both the first elastic modulus and the second elastic modulus are variable as the oil temperature changes so that, in the first operating configuration, or in the third operating configuration, the first elastic modulus is less than the second elastic modulus, while in the second operating configuration, the first elastic modulus is greater than the second elastic modulus.

12. Valve group according to claim 1, wherein the valve group is insertable and removable as a cartridge inside the duct.

13. Pressurized oil circuit comprising a valve group according to claim 1.

14. Oil filtration assembly for the filtration of engine oil of a vehicle, comprising:
   the valve group housed in the duct according to claim 1;
   an oil filtration device;
   a support body for the filtration device and the heat exchanger, fixable to the engine, comprising the duct having at least one inlet mouth through which the oil flows from the engine and at least one outlet mouth through which the oil flows to the filtration device, wherein the duct has, on the side wall that delimits the duct, at least one exchanger mouth through which the oil flows in the exchanger.

* * * * *